(12) United States Patent
Choumach et al.

(10) Patent No.: US 12,081,092 B2
(45) Date of Patent: Sep. 3, 2024

(54) QUICK CONNECT FOR TRACK AND MOVER SYSTEM

(71) Applicant: ROCKWELL AUTOMATION TECHNOLOGIES, INC., Mayfield Heights, OH (US)

(72) Inventors: Azeddine Choumach, Devens, MA (US); John Pearlman, Devens, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 540 days.

(21) Appl. No.: 17/476,159

(22) Filed: Sep. 15, 2021

(65) Prior Publication Data

US 2023/0077322 A1    Mar. 16, 2023

(51) Int. Cl.
*H02K 41/02*    (2006.01)
*H02K 15/00*    (2006.01)

(52) U.S. Cl.
CPC .............. *H02K 41/02* (2013.01); *H02K 15/00* (2013.01)

(58) Field of Classification Search
CPC ........ H02K 11/20; H02K 41/031; H02K 7/08; H02K 41/02; H02K 5/00; B65G 54/02
See application file for complete search history.

(56) References Cited

U.S. PATENT DOCUMENTS

2016/0176659 A1    6/2016    Aumann et al.

FOREIGN PATENT DOCUMENTS

| CN | 103691669 B | 3/2017 |
|---|---|---|
| SU | 363818 A1 | 12/1972 |

OTHER PUBLICATIONS

Extended European Search Report for Application No. 22194373.1 mailed Feb. 6, 2023, 12 pages.

*Primary Examiner* — Leda T Pham
(74) *Attorney, Agent, or Firm* — Fletcher Yoder, P.C.

(57) ABSTRACT

The present disclosure describes quick connect features of a mover assembly for a linear motor system. The mover assembly may include a platform and at least two movers. The movers may include a linkage feature and the platform at least two linkage elements. The movers may be removably coupled to the platform by rotating the movers relative to the platform between an engaged position and a disengaged position. In an engaged position, the linkage element of the platform may retain the linkage feature of the mover and the linkage element and the linkage feature may translationally couple the mover and the platform.

20 Claims, 9 Drawing Sheets

QUICK CONNECT FOR TRACK AND MOVER SYSTEM

BACKGROUND

The present disclosure relates generally to linear drive transport systems, and more particularly, to quick connect movers in linear drive transport systems.

A range of linear motors are known and in use throughout industry, particularly in manufacturing, filling, food, beverage, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Certain loads may require multiple movers for transportation due to the weight, shape, size, or any other suitable factor of the loads. In such applications, a platform may connect two or more movers and provide support for the load as the movers travel along the track. Traditionally, platforms are fastened directly to the movers with screws or other fasteners. As such, service and replacement of movers requires tools for disassembly of the platform from the movers and can be inefficient, costly, and time-consuming. Accordingly, as discussed herein, providing a tool-free quick connection between the movers and platforms may enable fast and efficient serviceability and replacement of movers.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a mover assembly of a linear motor system includes a platform and the platform includes a cylindrical recess extending from a first surface of the platform and a first ridge and a second ridge. The first ridge extends substantially parallel to the second ridge across the cylindrical recess. The mover assembly also includes a mover including a tab extending parallel to and offset from a first surface of the mover. The tab is free to move relative to the cylindrical recess when the mover is in a first orientation. The first ridge and the second ridge restrict movement of the tab when the mover is in a second orientation.

In another embodiment, a linear motor system includes a track section including a plurality of coils energizable to create a controlled magnetic field. The linear motor system includes a platform including a first cylindrical recess and a second cylindrical recess. The first cylindrical recess and the second cylindrical recess extend from a first surface of the platform. The platform also includes a first ridge and a second ridge and the first ridge extends substantially parallel to the second ridge across the first cylindrical recess. The platform also includes a third ridge and a fourth ridge and the third ridge extends substantially parallel to the fourth ridge across the second cylindrical recess. The linear motor system also includes a first mover including a tab extending parallel to and offset from a first surface of the mover and the tab is free to move relative to the cylindrical recess when the mover is in a first orientation. The first ridge and the second ridge restrict movement of the tab when the mover is in a second orientation. The linear motor system includes a second mover comprising a second tab extending parallel to and offset from a first surface of the second move and the second tab is free to move relative to the second cylindrical recess when the second mover is in a first orientation. The third ridge and the fourth ridge restrict movement of the tab when the second mover is in a second orientation.

In yet another embodiment, a method of assembly includes providing a first mover and a second mover, each mover including a corresponding tab extending parallel to and offset from a first surface of a corresponding mover and providing a platform including a first cylindrical recess and a second cylindrical recess, the first cylindrical recess and the second cylindrical recess extending from a first surface of the platform. The platform also includes a first ridge and a second ridge, the first ridge extends substantially parallel to the second ridge across the first cylindrical recess. The platform also includes a third ridge and a fourth ridge, the third ridge extends substantially parallel to the fourth ridge across the second cylindrical recess. The method also includes coupling the first mover, the second mover, or both to the platform to form a mover assembly. Coupling the first mover, the second mover, or both includes rotating the first mover, the second mover, or both relative to a corresponding cylindrical recess between a first orientation and a second orientation.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
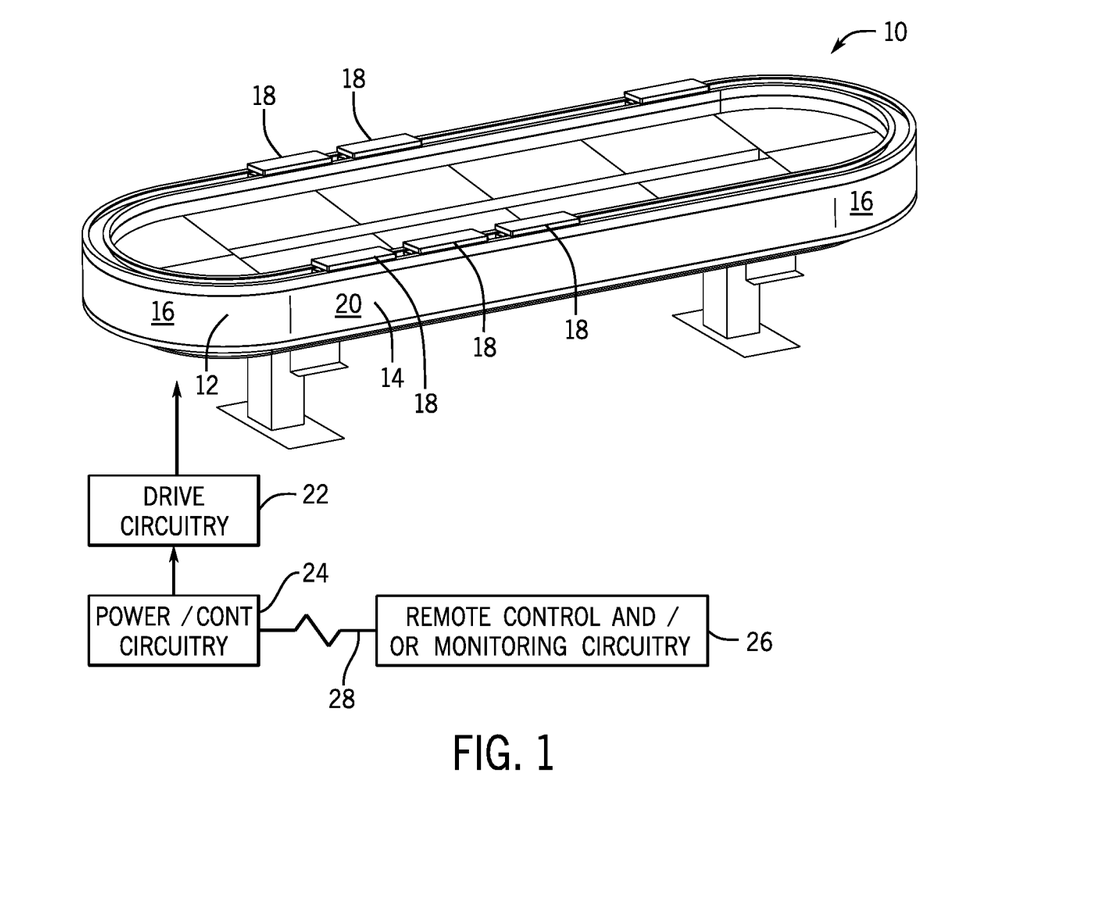
FIG. 1 is a perspective view of an exemplary linear motor system illustrating straight and curved track sections and several mover assemblies positioned for movement along the track sections, in accordance with embodiments described herein.

Turning now to the drawings, and referring first to FIG. 1, a linear motor system 10 is illustrated for moving articles or products around a track 12. As will be appreciated by those skilled in the art, in many applications, the linear motor system 10 may inter-operate with other machines, robots, conveyers, control equipment, and so forth (not separately shown) in an overall automation, packaging, material handling or other application. The linear motor system 10 may generally be referred to a "linear motor" as discussed below, in which the moving components are positioned, accelerated, decelerated, and generally moved under the influence of controlled magnetic and electromagnetic fields. In the illustrated embodiment, the track 12 comprises multiple straight track sections 14 and multiple curved track sections 16. These sections may be generally self-contained and mountable in various physical configurations, such as the oval illustrated in FIG. 1. It should be noted that other configurations are also possible as discussed below. The configurations may form closed loops of various shapes, but may also include open-ended segments. The linear motor system 10 may also include one or more mover assemblies 18, which may be mounted to and movable along the track 12. Again, the position, velocity, acceleration, and higher order derivative parameters are controllable for these mover assemblies 18 by appropriate control of the coils of the system that are energized and de-energized. In the illustrated embodiment, the mover assemblies 18 interact with stationary elements in and around an outer periphery 20 of the track sections 16, although other configurations are envisaged.

Each mover assembly 18 may include a mounting platform. In an actual implementation, various tools, holders, support structures, loads, and so forth may be mounted to this mounting platform. The mover assemblies 18 themselves may be configured differently from those shown in order accommodate the various loads. While a horizontal configuration is illustrated in FIG. 1, other orientations may also be provided, such as ones in which the illustrated oval is generally stood on a side or end, or at any angle between.

The linear motor system 10 may also include circuitry for controlling a movement of the movers. In the embodiment illustrated in FIG. 1, this circuitry may include drive circuitry 22 that provides signals to each track section 16, and specifically individual coils of the track sections 16 to create electromotive forces that interact with magnets on the track sections 16 to drive the mover assemblies 18 to specific locations, and at specific velocity, accelerations, and so forth. This drive circuitry 22 may typically include inverter circuitry that makes use of power electronic switches to provide drive power to the individual coils of each section in a controlled manner. In some embodiments, the drive circuitry 22 may be included in each individual track section 16, and signals provided to the drive circuitry 22 by power and control circuitry 24. This power and control circuitry 24 (and the drive circuitry 22) may receive feedback from the mover assemblies 18 to detect the location, velocity, acceleration, and so forth of each mover assembly 18. In certain embodiments, the mover assemblies 18 may also be recognized by the power and control circuitry 24 as individual axes that are independently controlled, but with regulation of their position, velocity, and acceleration to avoid conflicts, collisions, and so forth. The particular motion profile implemented by the power and control circuitry 24 may typically be implemented upon the design and commissioning of the linear motor system 10, depending upon the particular task to be performed. Finally, various remote control and/or monitoring circuitry 26 may be provided and may be linked to the linear motor system 10 by one or more networks 28. Such remote circuitry 26 may generally allow for coordination of the operation of the linear motor system 10 with other automation components, machine systems, manufacturing and material handling machines, and so forth.

Figure 2:
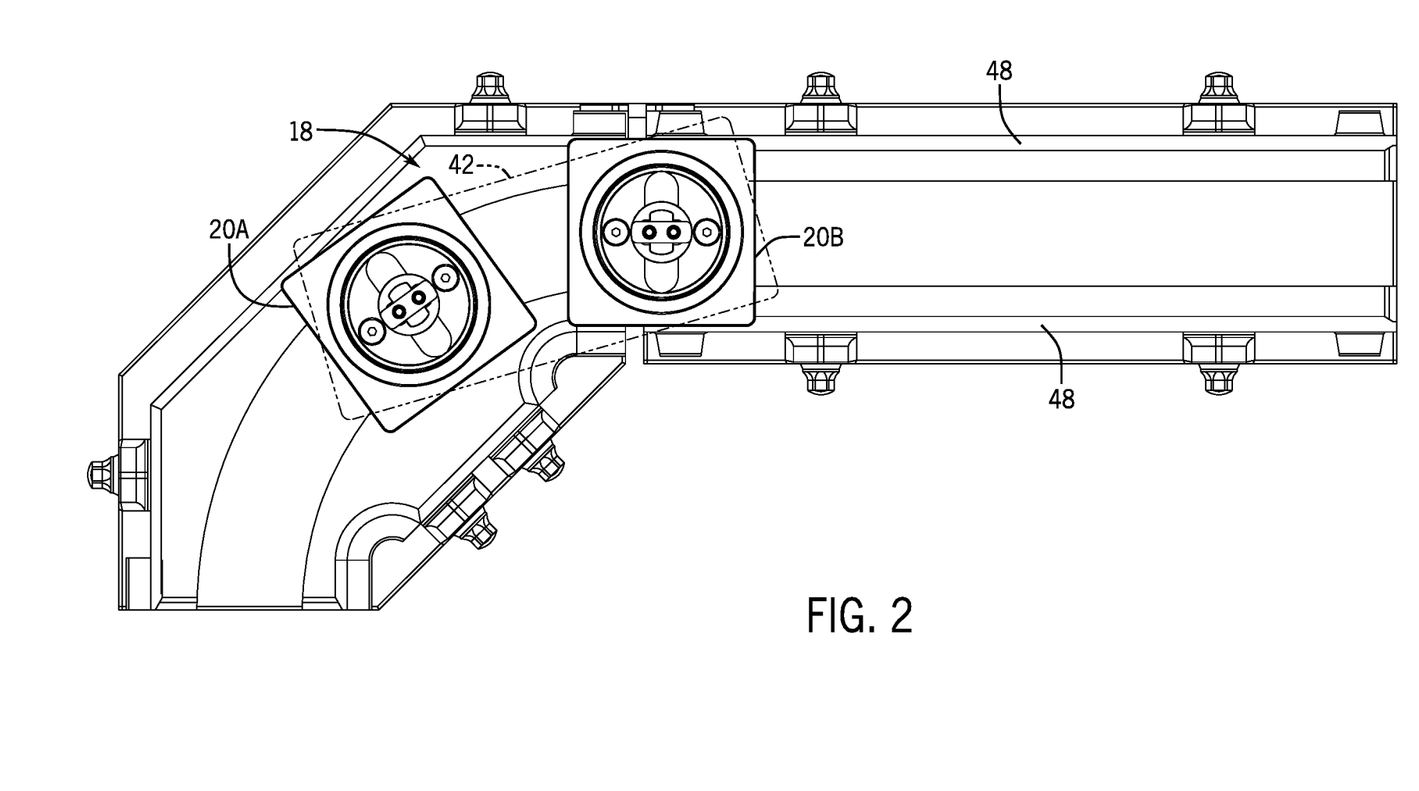
FIG. 2 is a top view of a mover assembly of the linear motor system of FIG. 1 including a platform coupled to first and second movers, in accordance with embodiments described herein.

FIG. 2 is a perspective view of one of the mover assemblies 18 of the linear motor system 10. The mover assembly 18 is positioned along a track section including rails 48. The mover assembly 18 may include a first mover 20A, a second mover 20B, and a platform 42. The movers 20A, 20B may move along the rails 48 and may be coupled to each other via the platform 42. The platform 42 may support varying loads for the mover assembly 18. As shown in FIG. 2, the movers 20A, 20B may travel along the rails 48 around a curved track section without either mover 20A, 20B disengaging from the platform 42. As discuss further herein, the movers 20A, 20B may rotate to some threshold angle, up to ninety degrees, relative to the platform 42 before disengagement (e.g., at least 45 degrees, at least 60 degrees, at least 70 degrees, at least 80 degrees, and so forth).

Figure 3:
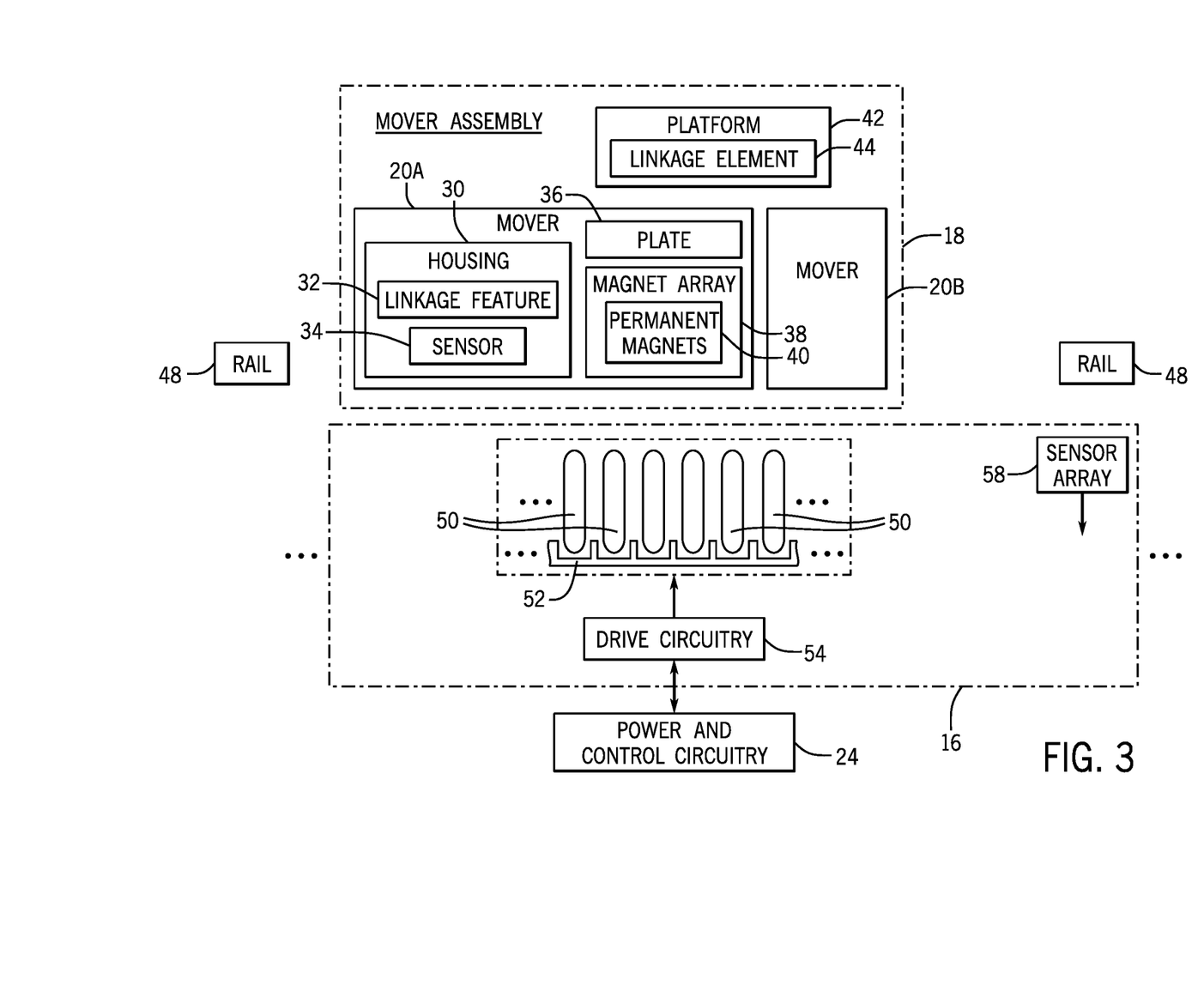
FIG. 3 is a diagrammatical representation of the system of FIGS. 1 and 2, in accordance with embodiments described herein.

FIG. 3 is a diagrammatical representation of the linear motor system 10 showing one track section 16 and one mover assembly 18 positioned along the track section 16. The track section 16 illustrated in FIG. 3 may be a straight or curved track section, these two differing in their physical configuration, and certain of the actual characteristics owing to the curved nature of the curved sections as discussed below. In general, however, each mover assembly 18 may include two movers, such as the first mover 20A and the second mover 20B. In some embodiments, each mover 20A, 20B may include a housing 30 including any number of linkage features 32. For example, the linkage feature 32 may be a tab and the platform 42 may include a corresponding slot of a linkage element 44 for receiving the tab. The linkage feature 32 and linkage element 44 may interface to couple each mover 20A, 20B to the platform 42. In some embodiments, each mover 20 may include a plate 36 coupled to the housing 30. For example, the plate 36 may be coupled to the housing 30 via any number of fasteners. The plate 36 may couple to a magnet array 38 on which a number of magnets 40 may be mounted. These magnets 40 may be permanent magnets and may be mounted such that a small air gap is provided between the magnets 40 and coils 50 of the track section 16.

As shown in FIG. 3, the mover assembly 18 may also include a sensor component 34, such as a permanent magnet, energized coils, Hall effect sensors, or any other suitable devices. It should be noted, however, that the particular sensor component 34 included in each mover 20 may depend upon the nature of the sensing strategy, the sensing resolution, the position of the sensor component 34 on the mover assembly 18 (and cooperating components on the track section 16), and so forth. The platform 42 is provided on the mover assembly 18 for mounting tools, loads, and the like. The bearing 34 may be mounted to the mechanical structure (e.g., the housing) of the mover assembly 18 and may serve to interact with one or more rails of the track 48. The bearing 34 and rails of the track 48 may allow the mover assembly 18 to remain securely attached to the track section 16 while allowing relatively free movement of the mover assemblies 18 along the track section 16 and supporting mechanical loads and forces encountered during motion.

The track section 16 may include a series of parallel coils 50 that are associated with a stator or armature 52. In currently contemplated embodiments, these coils 50 may be mounted into slots in the stator 52, and the stator 52 itself may be made of magnetic material formed into a stack of laminates and structured to allow for mounting within the track section 16 housing. Particular configurations, magnetic structures, mounting structures and the like of the coils 50 and stator 52 components are generally beyond the scope of the present disclosure. Drive circuitry 54 may be included in each track section 16 as discussed above to allow for controlled power signals to be applied to the coils 50 in order to drive and position the mover assemblies 18 appropriately around the track section 16. Finally, a sensor array 58 is provided in each track section 16 to allow for interaction with the sensor components 34 of the mover assemblies 18. This sensor array 58 may provide feedback that can indicate the position of the mover assemblies 18, and can be used to derive velocity, acceleration, jerk, and other motion parameters. In the illustrated embodiment, a number of track sections 16 may be mounted end-to-end and interconnected with one another and/or with the power and control circuitry 24 to receive signals used to power the coils 50.

As will be appreciated by those skilled in the art, track sections 16, along with the magnet arrays 38 of the mover assemblies 18, may generally form what may be considered the linear motor system 10. That is, electromotive force is generated by the controlled fields of the coils 50 and interaction between these fields and the magnetic fields of the magnet array 38 serve to drive the mover assembly 18 into desired positions, at desired speeds, and so forth. As noted above, these coils 50 and the linear motor itself may be designed in accordance with various configuration strategies, such as ones having the coils 50 arranged around a periphery of the track sections 16, ones in which the coils 50 are generally planar (in a top or bottom position of the track sections 16), and so forth. Although the "linear" motor system 10 may be used in the present disclosure, it should be appreciated that curved sections in various configurations are intended to be included in the scope of the present disclosure.

Figure 4:
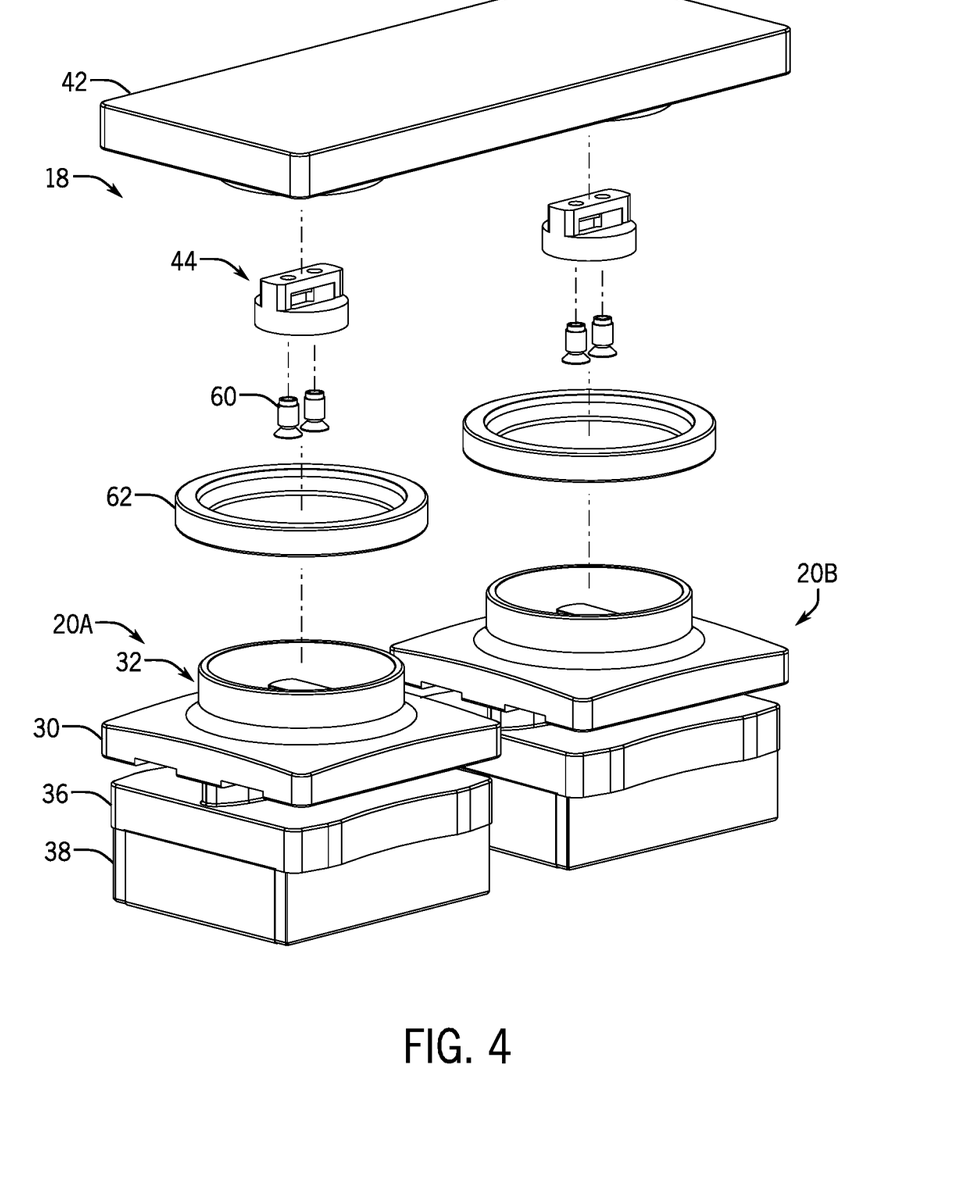
FIG. 4 is an exploded view of the mover assembly of FIG. 2, in accordance with embodiments described herein.

With the foregoing in mind, FIG. 4 illustrates a perspective exploded view of the mover assembly 18 of FIG. 1 including the movers 20A, 20B and the platform 42, in accordance with an embodiment of a present disclosure. The housing 30 may include the linkage feature 32 and the linkage feature 32 may be disposed on a first surface of the housing 30 facing the platform 42. The plate 36 may be disposed between the housing 30 and magnet array 38. The linkage element 44 may couple to the platform via fasteners, such as fasteners 60. As is described below in more detail, the linkage element 44 is configured to mate to the linkage feature 32 to couple the platform 42 to the movers 20A, 20B. A seal, such as rubber gasket 62 may be at least partially disposed in a recess of the platform 42 and may engage a portion of the linkage feature 32. The seal may prevent entry of liquids and/or debris into an interior of the linkage feature 32. In certain embodiments, the platform 42 may support an associated load for the mover assembly 18. The platform 42 may include a top surface that may be substantially flat. The top surface may support the associated load and may allow for easy cleaning and/or servicing before and/or after completing operations with the mover assembly 18. For example, during a food/beverage operation, liquids and/or solids may spill onto the top surface of the platform 42 and may affect the usability of the mover assembly 18. The substantially flat, top surface of the platform 42 may case cleanup operations by allowing liquids and/or solids to be washed off with a suitable cleaning material.

Figure 5:
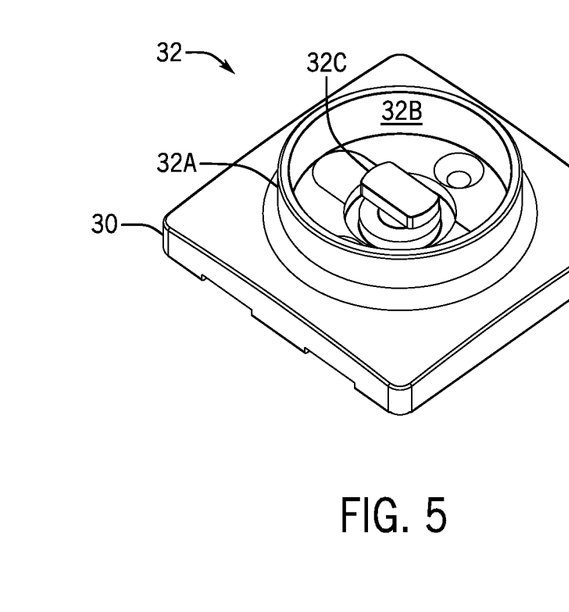
FIG. 5 is a perspective view of a housing of one of the movers of FIG. 2, in accordance with embodiments described herein.

With the foregoing in mind, FIG. 5 illustrates a perspective view of the housing 30 of one of the movers, in accordance with an embodiment of the present disclosure. The linkage feature 32 may include a retaining wall 32A, a recess 32B, and a tab 32C. The retaining wall 32A may be formed on and extend outward from a first surface 32D of the housing 30. The first surface 32D may face a bottom surface of platform 42. The retaining wall 32A may be hollow and generally cylindrical, having the recess 32B therein. For example, the retaining wall 32A may be disposed about and define the recess 32B. An upper lip of the retaining wall 32A may engage the seal (shown as element 62 in FIG. 4) when the mover 20 is engaged with the platform. The seal may prevent entry of debris and/or liquids into the recess 32B. The tab 32C may be formed in the recess 32B and on the first surface 32D of the housing 30 and may extend parallel to and offset from the first surface 32D of the housing 30 via an extrusion that extends from the first surface 32D of the housing 30 to the first tab. The tab 32C may be substantially rectangular in shape and may have two opposite ends that extend outward from the extrusion, towards an inner surface of the retaining wall 32A such that the opposite ends of the tab 32C are cantilevered out over the first surface 32D of the housing 30.

Figure 6:
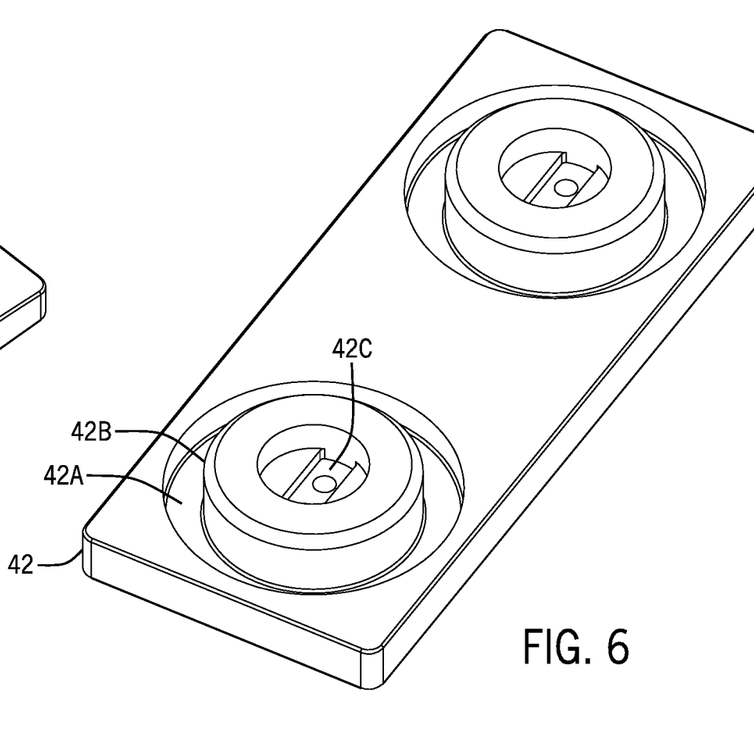
FIG. 6 is a perspective view of the platform of FIG. 2, in accordance with embodiments described herein.

With the foregoing in mind, FIG. 6 illustrates a perspective view of the platform 42, in accordance with an embodiment of the present disclosure. The platform 42 may include a recess 42A disposed at least partially through the bottom surface 42D of the platform 42 facing the housing 30. The recess 42A may be cylindrical and may be disposed about or surrounding a retaining wall 42B of the platform 42. The retaining wall 42B may be a hollow cylinder having a recess 42C therein. The recess 42C may receive the linkage element 44 and the linkage element 44 may be at least partially disposed in the recess 42C and may be retained in the recess 42C via the fasteners 60. The recess 42C may include a slot configured to receive a ridge of the linkage element 44 and the slot may retain and may hold the linkage element 44 in place to prevent rotation of the linkage element 44 relative to the platform 42.

Figure 7:
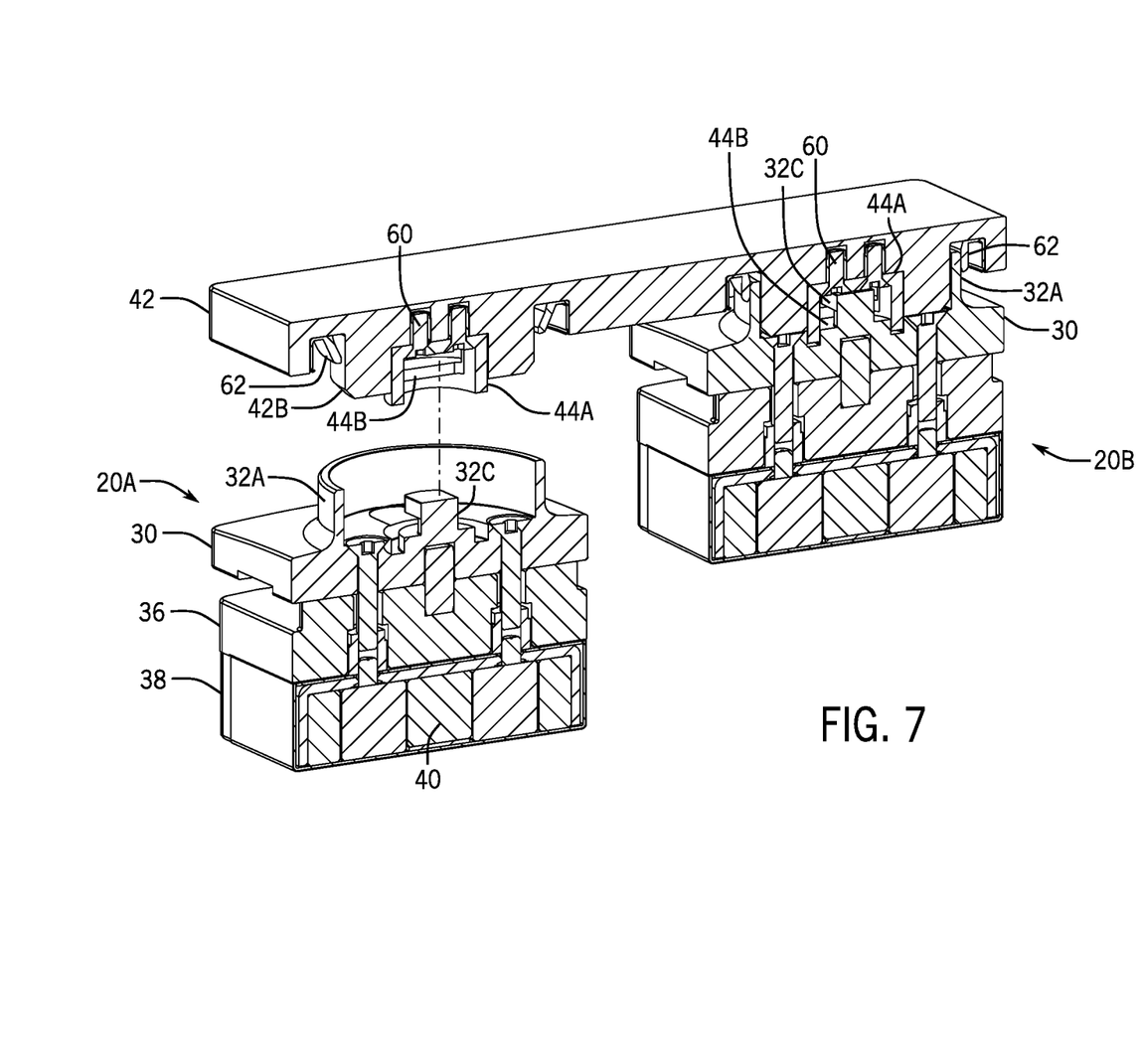
FIG. 7 is a cross-sectional view of the first mover separated from the platform and the second mover in an engaged position with the platform, in accordance with embodiments described herein.

With the foregoing in mind, FIG. 7 illustrates a cross-sectional view of the mover assembly 18, in accordance with an embodiment of the present disclosure. As shown in FIG. 7. the cross-section is taken parallel to the direction of motion of the mover assembly 18 when on a straight track section 16. The first mover 20A is shown separated from the platform 42 and the second mover 20B is shown in the engaged position. The first mover 20A is oriented relative to the platform 42 in the same manner as second mover 20B. For example, the end of the tab 32C extends substantially perpendicular to the direction of motion. The linkage element 44 includes an outer retaining wall 44A having a recess disposed therein. Any number of ridges 44B may be disposed in the recess and the ridges 44B may receive and/or retain the tab 32C and may retain and may restrain lateral movement of the mover 20. For example, second mover 20B is shown in the engaged position with the ridge 44B retaining the tab 32C and coupling the second mover 20B to the platform 42. In the engaged position, the second mover 20B may freely rotate relative to the platform 42. For example, the second mover 20B may rotate to some threshold angle, up to ninety degrees, relative to the platform 42 before disengagement (e.g., at least 45 degrees, at least 60 degrees, at least 70 degrees, at least 80 degrees, and so forth).

In certain embodiments, the linkage element 44 defines an interior volume including a recess. The ridges 44B may be formed on and extend away from an inner surface of the retaining wall 44A. In some embodiments, the ridges 44B may be formed on opposite sides of the inner surface and may extend parallel to each other. For example, the ridges 44B may extend at least partially across the interior volume (e.g., the recess) of the linkage element 44. The ridges 44B may define a channel therebetween and may separate the interior volume of the linkage element 44 into a first portion (e.g., a lower portion adjacent the mover 40) and a second portion (e.g., an upper portion adjacent the fasteners 60). In certain embodiments, a portion (e.g., the tab 32C) of the linkage feature 32 may be inserted through the channel from the first portion into the second portion of the interior volume. The tab 32C may be rotated within the interior volume to interface with the ridges 44B and couple (e.g., retain) the mover 40 to the platform 42.

Additionally or alternatively, the linkage element 44 may define a cylindrical volume having ridges 44B formed at an end of the cylindrical volume. The ridges 44B may form a substantially rectangular passageway therebetween and a portion of the linkage feature 32 may extend through the rectangular passageway to couple the linkage element 44 and the linkage feature 32. For example, the tab 32C may extend through the rectangular passageway into the cylindrical volume of the linkage element 44 and may be rotated to interface with the ridges 44B. Accordingly, the tab 32C and ridges 44b may couple the mover 40 to the platform 42.

Additionally or alternatively, a lip may extend partially across a substantially circular recess of the linkage element 44. The substantially circular recess may be formed centrally through the linkage element. The lip may catch a tab of the linkage feature 32 when the tab is in a first orientation relative to the lip. For example, the lip may restrict movement (e.g., translational movement) of the tab 32C when the tab 32C is in a first orientation relative to the lip and/or when the mover 40 is in a first orientation relative to the platform 42. In certain embodiments, the lip may allow translational (e.g., longitudinal, lateral, vertical) movement of the tab relative to the lip in a second orientation. For example, the tab may rotate between the first orientation and the second orientation.

Figure 8A:
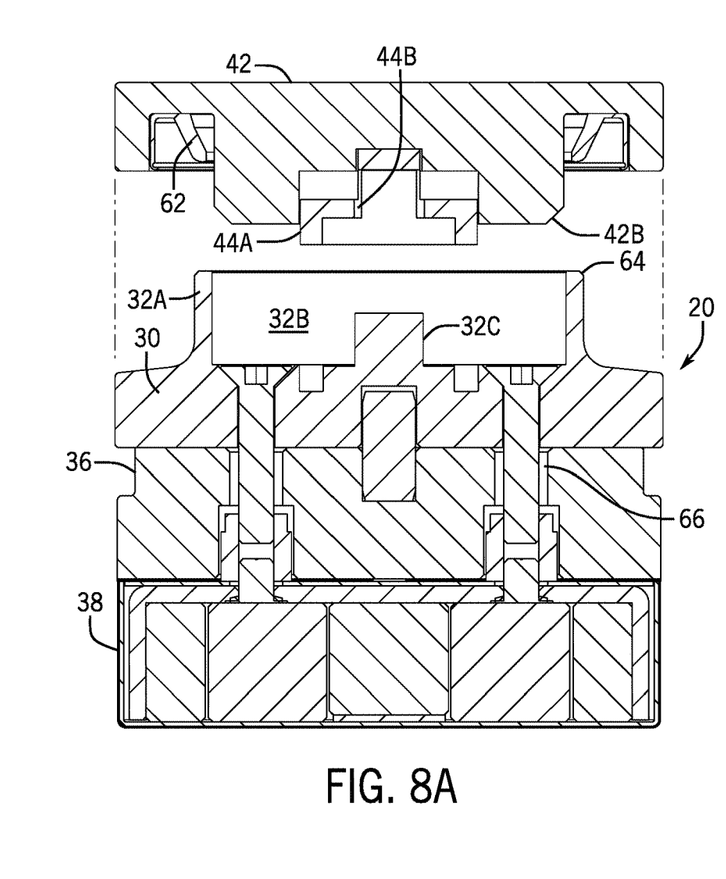
FIGS. 8A and 8B illustrate a cross-sectional view of one of the movers separated from the platform and in a disengaged position, in accordance with embodiments described herein.
Figure 8B:
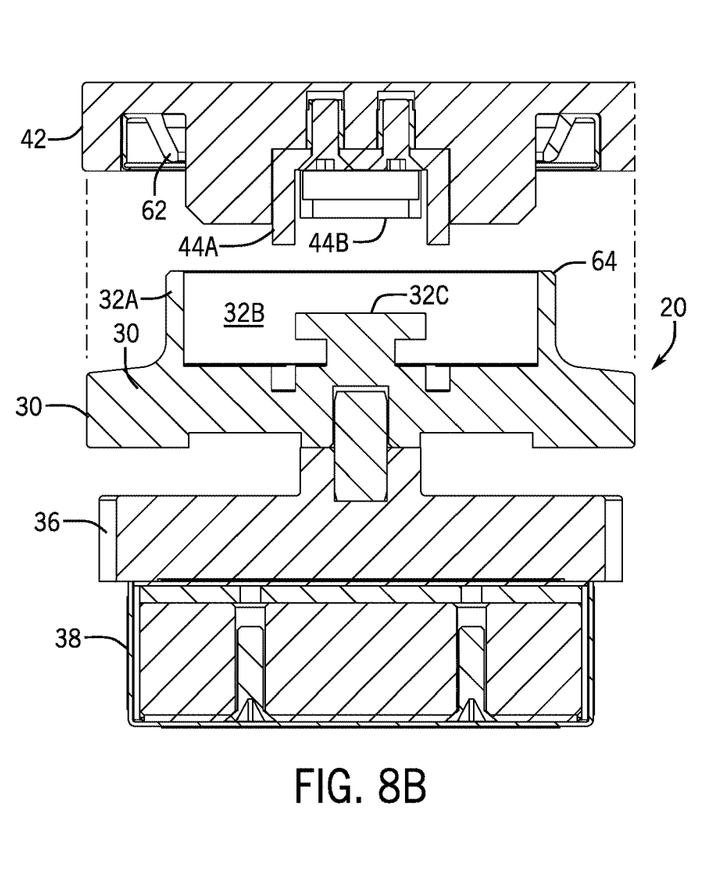

With the foregoing in mind, FIGS. 8A and 8B illustrate cross-sectional views of a mover 20 in a disengaged position relative to the platform 42, in accordance with an embodiment of the present disclosure. The cross-sectional view of the mover 20 and the platform 42 in FIG. 8A is taken perpendicular to the direction of motion of the mover assembly 18 when on a straight track section 16. The cross-sectional view of the mover 20 and the platform 42 in FIG. 8B is taken parallel to the direction of motion of the mover assembly 18 when on a straight track section 16. As shown in FIGS. 8A and 8B, the mover 20 is separated from the platform 42 and rotated ninety degrees relative to the platform 42 from the engaged position. For example, the mover 20 may be rotated at least 45 degrees, at least 60 degrees, at least 80 degrees, and so forth, between the engaged positon and the disengaged position. The linkage element 44 may include an opening for receiving the tab 32C of the linkage feature 32. For example, the opening may be disposed between ridges 44B of the linkage element 44. The lip 64 of the retaining wall 32A may be received by and may seal against the rubber gasket 62. The seal may prevent entry of debris and/or liquid into the recess 32B of the housing 30. Any number of fasteners, such as fastener 66 may couple the housing 30, the plate 36, and/or the magnet array 38.

Figure 9A:
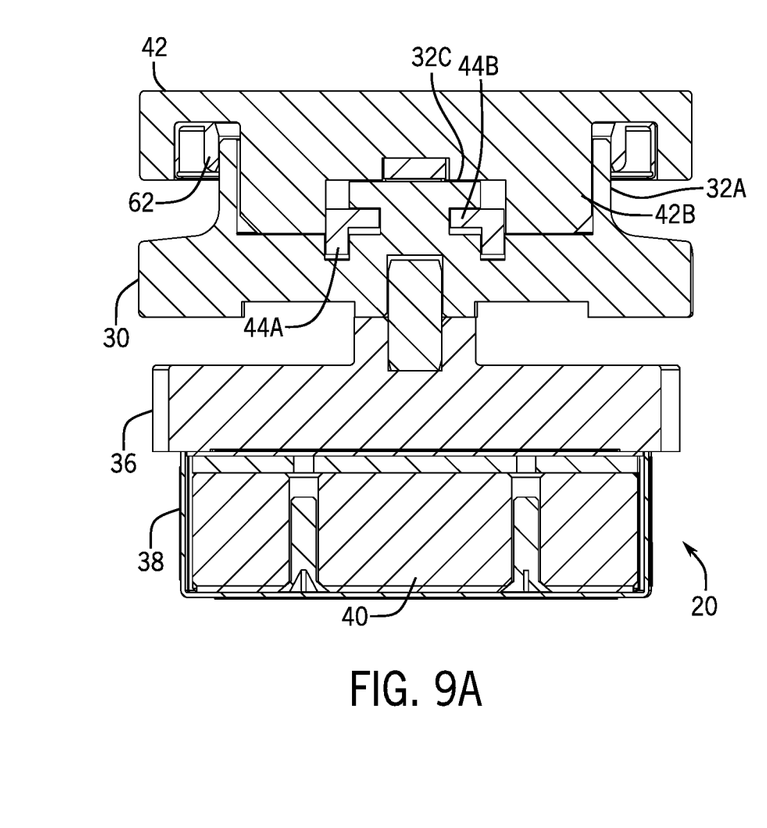
FIGS. 9A and 9B illustrate a cross-sectional view of one of the movers in the engaged position with the platform, in accordance with embodiments described herein.
Figure 9B:
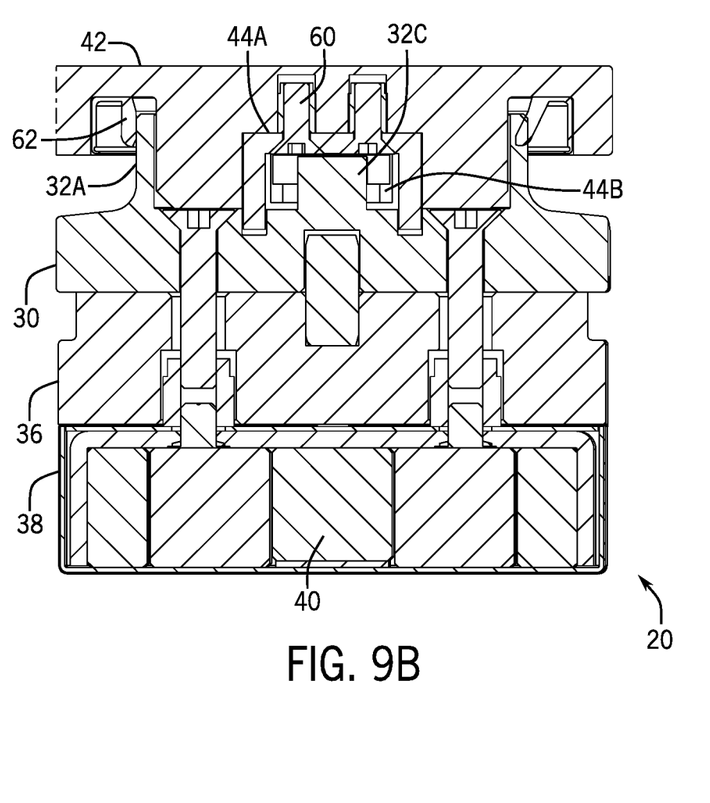

With the foregoing in mind, FIGS. 9A and 9B illustrate cross-sectional views of a mover 20 in the engaged position relative to the platform 42, in accordance with an embodiment of the present disclosure. The cross-sectional view of the mover 20 and the platform 42 in FIG. 9A is taken perpendicular to the direction of motion of the mover assembly 18 when on a straight track section 16. The cross-sectional view of the mover 20 and the platform 42 in FIG. 9B is taken parallel to the direction of motion of the mover assembly 18 when on a straight track section 16. As shown in FIGS. 9A and 9B, the tab 32C of the linkage feature 32 is inserted through the opening of the linkage element 44 and the mover 20 is rotated relative to the platform 42 until the ends of the tab 32C extend over the ridges 44B of the linkage element 44, thus coupling the platform 42 to the mover 20. In the engaged position, the mover 20 and the platform 42 may be translationally coupled relative to each other. For example, the ridges 44B may laterally, longitudinally, and vertically couple the mover 20 to the platform 42 while still allowing rotation of the mover 20 relative to the platform 42. Curved track sections 16 may rotate the mover 20 relative to the platform by up to thirty degrees (e.g., up to 25 degrees, up to 20 degrees, and so forth) as the mover travels through a turn of the curved track section 16. In some embodiments, the mover 20 may be rotated up to ninety degrees before disengaging from the platform 42 (e.g., at least 45 degrees, at least 50 degrees, at least 60 degrees, at least 75 degrees, and so forth). Accordingly, by permitting rotation of the mover 20 relative to the platform 42, the mover assembly 18 may navigate curved track sections 16 without disengaging the mover 20 from the platform 42.

Figure 10:
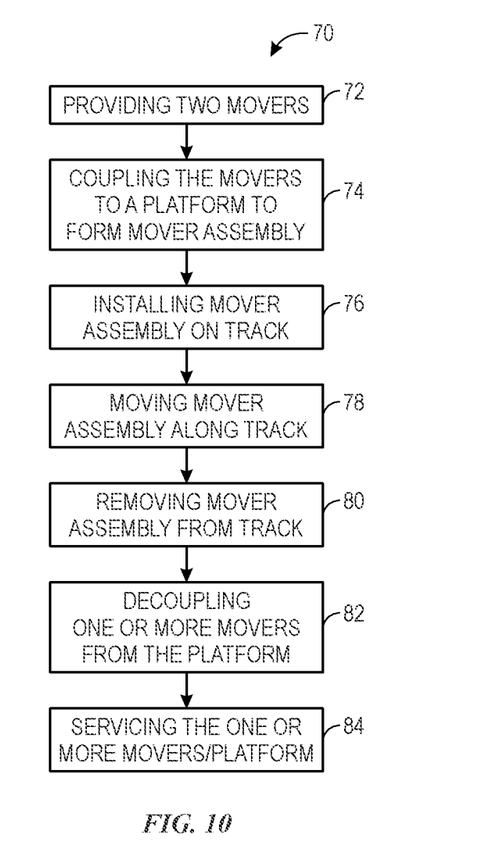
FIG. 10 illustrates a flowchart of a method for assembling, operating, and disassembling the mover assembly, in accordance with embodiments described herein.

With the foregoing in mind, FIG. 10 illustrates a flowchart of a method for assembling the mover assembly 18, operating the mover assembly 18 along the track 12, and disassembling the mover assembly 18, in accordance with embodiments of the present disclosure. While the method is described using steps in a specific sequence, additional steps may be performed, the described steps may be performed in different sequences than the sequence illustrated, and certain described steps may be skipped or not performed altogether. Further still, the steps of the method may be performed in parallel with one another, such as at the same time, and/or in response to one another.

At block 72, a user may provide two movers 20 and a platform 42. At block 74, the user may couple the movers 20 to the platform to form the mover assembly 18. In some embodiments, the corresponding linkage feature 32 of one or more of the movers 20 may be inserted into the linkage element 44 of the platform 42. Additionally or alternatively, one or more of the movers 20 may be rotated relative to the platform 42 to couple the corresponding mover 20 to the platform 42 to form the mover assembly 18, as described herein.

At block 76, the mover assembly 18 may be installed and/or coupled to the track 12. In certain embodiments, the mover assembly 18 may be installed along a track section such that a portion of the mover assembly 18 contacts rails 48 of the track section. For example, a corresponding housing 30 of each mover 20 of the mover assembly 18 may engage and contact the rails 48 of the track section. At block 78, the mover assembly 18 may be moved along the track 12. For example, the drive circuitry 54 of the of the track section 16 may energize coils 50 to generate a magnetic field. The generated magnetic field may interact with corresponding magnet arrays 38 of each of the mover 20 of the mover assembly 18 and may drive the mover assembly 18 along the track 12.

After a certain amount of use (e.g., threshold time period, threshold distance, threshold load amount), the mover assembly 18 may require service and/or repair (e.g., replacing components, repairing components, cleaning, lubricating, and so forth). At block 80, the mover assembly 18 may be removed from the track 12. At block 82, the corresponding movers 20 of the mover assembly 18 may be decoupled from the platform 42. In certain embodiments, the corresponding linkage features of the movers 20 may be retracted from the corresponding linkage elements 44 of the platform 42. Additionally or alternatively, the corresponding movers 20 may be rotated relative to the platform 42 to decouple the corresponding movers 20 from the platform 42 and disassemble the mover assembly 18. At block 84, the decoupled and/or disengaged components of the mover assembly 18 may be inspected and/or serviced according to manufacturer guidelines (e.g., threshold time period for any number of components, threshold distance for any number of components, threshold load amount for any number of components, and so forth).

The present disclosure includes a quick connect mover assembly in linear drive transport systems. The mover assembly provides fast connection and disconnection between movers and a mounted platform. A linkage feature on the mover and a linkage element on the platform allows for connection and disconnection to be completed by rotating either the mover and/or the platform relative to one another. Technical effects of the disclosed techniques include fast connection and disconnection without the use of tools and increase ease of replacing and servicing movers for a mover assembly.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . "or" step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mover assembly of a linear motor system, comprising:
a platform comprising:
a cylindrical recess extending from a first surface of the platform; and
a first ridge and a second ridge, wherein the first ridge extends substantially parallel to the second ridge across the cylindrical recess; and
a mover comprising:
a tab extending parallel to and offset from a first surface of the mover, wherein the tab is free to move relative to the cylindrical recess when the mover is in a first orientation and wherein the first ridge and the second ridge restrict movement of the tab when the mover is in a second orientation.

2. The mover assembly of claim 1, wherein the first orientation and the second orientation are offset from one another by at least 45 degrees.

3. The mover assembly of claim 1, comprising a second mover comprising a second tab extending parallel to and offset from a first surface of the second mover, wherein the second tab is free to move relative to the cylindrical recess when the second mover is in a first orientation and wherein a third ridge and a fourth ridge of the platform restrict movement of the second tab when the second mover is in a second orientation.

4. The mover assembly of claim 1, comprising a seal disposed between the platform and the mover, wherein the seal is configured to seal against a portion of the mover.

5. The mover assembly of claim 4, wherein the seal is configured to seal the cylindrical recess.

6. The mover assembly of claim 1, wherein the platform comprises an insert defining the first ridge and the second ridge.

7. The mover assembly of claim 6, comprising fasteners configured to couple the insert to the platform.

8. The mover assembly of claim 1, wherein the mover comprises a recess, the tab formed in the recess.

9. The mover assembly of claim 1, wherein the mover comprises a wall defining a circular recess, the tab formed within the circular recess.

10. The mover assembly of claim 9, wherein the tab extends towards an inner surface of the wall.

11. A linear motor system, comprising:
a track section comprising a plurality of coils energizable to create a controlled magnetic field;
a platform comprising:
- a first cylindrical recess and a second cylindrical recess, wherein the first cylindrical recess and the second cylindrical recess extend from a first surface of the platform; and
- a first ridge and a second ridge, wherein the first ridge extends substantially parallel to the second ridge across the first cylindrical recess;
- a third ridge and a fourth ridge, wherein the third ridge extends substantially parallel to the fourth ridge across the second cylindrical recess;

a first mover comprising a tab extending parallel to and offset from a first surface of the first mover, wherein the tab is free to move relative to the first cylindrical recess when the first mover is in a first orientation and wherein the first ridge and the second ridge restrict movement of the tab when the first mover is in a second orientation; and a second mover comprising a second tab extending parallel to and offset from a first surface of the second mover, wherein the second tab is free to move relative to the second cylindrical recess when the second mover is in a first orientation and wherein the third ridge and the fourth ridge restrict movement of the tab when the second mover is in a second orientation.

12. The linear motor system of claim 11, wherein the first orientation and the second orientation are offset from one another by at least 45 degrees.

13. The linear motor system of claim 11, wherein the platform is configured to support a load and wherein the platform is configured to be used for a food operation, a beverage operation, or a combination thereof.

14. The linear motor system of claim 13, wherein the platform comprises an insert defining the first ridge and the second ridge.

15. A method of assembly, comprising:
providing a first mover and a second mover, each mover comprising a corresponding tab extending parallel to and offset from a first surface of a corresponding mover;
providing a platform comprising:
- a first cylindrical recess and a second cylindrical recess, wherein the first cylindrical recess and the second cylindrical recess extend from a first surface of the platform; and
- a first ridge and a second ridge, wherein the first ridge extends substantially parallel to the second ridge across the first cylindrical recess; and
- a third ridge and a fourth ridge, wherein the third ridge extends substantially parallel to the fourth ridge across the second cylindrical recess; and coupling the first mover, the second mover, or both to the platform to form a mover assembly, wherein coupling the first mover, the second mover, or both comprises rotating the first mover, the second mover, or both relative to a corresponding cylindrical recess between a first orientation and a second orientation.

16. The method of claim 15, comprising installing the mover assembly on a track of a linear motor system.

17. The method of claim 16, wherein the first orientation and the second orientation are offset from one another by at least 45 degrees.

18. The method of claim 16, wherein the platform comprises an insert that defines the first ridge and the second ridge.

19. The method of claim 15, wherein the platform is configured to support a load and wherein the platform is configured to be used for a food operation, a beverage operation, or a combination thereof.

20. The method of claim 15, comprising decoupling the first mover, the second mover, or both from the platform, wherein decoupling comprises rotating from the second orientation to the first orientation.

* * * * *